(No Model.)

L. E. DE GRAND-VAL.
Preserve Jar.

No. 240,673.        Patented April 26, 1881.

WITNESSES:
Chas M. Higgins
Jno. Elsavin

INVENTOR:
Louis E. de Grandval
by S. M. Walis Jr.
Attys.

UNITED STATES PATENT OFFICE.

LOUIS E. DE GRAND-VAL, OF JERSEY CITY, NEW JERSEY, ASSIGNOR OF TWO-THIRDS TO MARY W. DAVIDSON, OF NEW YORK, N. Y.

PRESERVE-JAR.

SPECIFICATION forming part of Letters Patent No. 240,673, dated April 26, 1881.

Application filed August 21, 1880. (No model.)

*To all whom it may concern:*

Be it known that I, LOUIS E. DE GRAND-VAL, of Jersey City, Hudson county, New Jersey, have invented certain new and useful Improvements in Preserve-Jars, of which the following is a specification.

The chief aim of my invention is to provide a simple and efficient jar for the package and transportation of fresh milk, but which may also be used for other purposes; and my invention is embodied, mainly, in the device for clamping the cover thereon, as hereinafter fully set forth.

Figure 1:
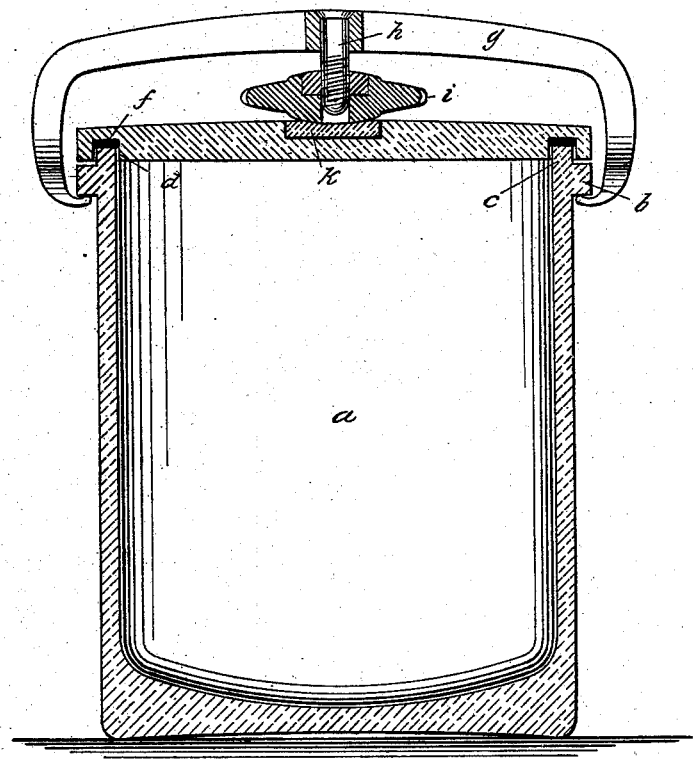
Figure 2:
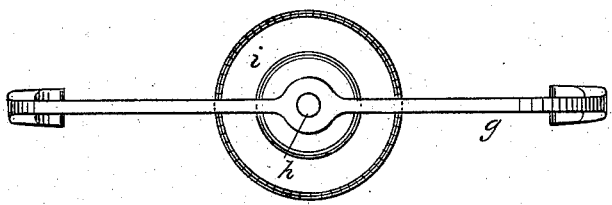

Figure 1 of the annexed drawings gives a vertical section of my improved jar, and Fig. 2 a plan view of the clamping device thereof.

The body $a$ of the jar is preferably made of pressed glass, in a cylindrical or slightly-tapering form. The internal bottom of the jar is preferably rounded concavely, as shown, and the cylindrical or slightly-tapering sides rise therefrom in a straight line, without contraction or enlargement, to the very edge of the mouth, as seen in Fig. 2. This form of jar is not only readily formed by press-molds, but is readily filled with the milk, and, what is very important for a milk-jar, admits of being easily and thoroughly cleaned.

The jar has an outwardly-projecting rim or shoulder, $b$, formed around its exterior just below its mouth, leaving the top edge of the jar rising therefrom to form a raised lip or bead, which is flush with the inner sides of the jar, as shown in Fig. 1. The cover $d$, which is also formed of pressed glass, has an annular groove, $e$, on its under side, into which the projecting bead or lip of the jar fits when the cover is placed thereon, while the margin of the cover closely approaches the shoulder $b$.

The edge of the lip on the jar and the bottom of the groove in the cover may be ground to effect a tight joint without packing; but I ordinarily prefer to embed a small rubber ring, $f$, in the bottom of the groove, to form a tight elastic joint with the lip of the jar, as illustrated.

It will now be observed that by avoiding any internal shoulders, ledges, or grooves on the jar, but instead providing the same with a projecting lip to meet with an upwardly-extended groove in the cover, all lodgments of thickened or hardened milk about the joint of the cover with the jar is prevented, and the jar thus kept in a better condition for receiving the milk.

The device for clamping the cover onto the jar consists of a yoke, $g$, of ordinary form, the claws of which catch under the shoulder $b$ in the usual manner; but in the center of the yoke is fixed a screw, $h$, which projects toward the center of the cover, and on this fixed screw a broad milled disk or nut, $i$, turns, which, being screwed against the top of the jar, or preferably against a cushion of rubber or leather, $k$, inserted in a cavity therein, forces the cover to its seat with a firm elastic pressure in a simple and efficient manner.

It will be seen that, as the clamping-nut $i$ may be made quite broad without objection, an easy and ample purchase may be obtained thereon by the fingers for tightening or loosening the same, and as this clamping device lies quite close to the cover and below the yoke, the top of the jar is thus more compact, and, furthermore, all salient projections from the top of the jar or above the yoke are obviated, thus rendering the jar less liable to collisions with objects which would tend to injure or loosen the clamping devices, and thus presenting a material improvement over the ordinary thumb-screw.

What I claim is—

A clamping device for preserve-jars, consisting of a yoke provided with a fixed screw projecting toward the jar-cover, in combination with a movable nut screwing thereon to or from the jar-cover, substantially as and for the purpose set forth.

LOUIS E. DE GRAND-VAL.

Witnesses:
 EDWARD H. WALES,
 CHAS. M. HIGGINS.